Patented Feb. 24, 1953

2,629,724

UNITED STATES PATENT OFFICE 2,629,724

THERAPEUTIC ANTIMONY COMPOUNDS

Le Roy Wilton Clemence, Highland Park, Ill., assignor to Abbott Laboratories, North Chicago, Ill., a corporation of Illinois No Drawing. Application September 7, 1949, Serial No. 114,453

18 Claims. (Cl. 260—446)

This invention relates to antimony compounds having therapeutic properties, and more specifically to the 2-substituted-4-methylol-4,5-dihydro-1,3,2-dithiastibioles.

The organic-antimony compounds of my invention are valuable for treating schistosomiasis, which is an infection of Schistosoma (a genus of trematode parasites or flukes). Schistosomiasis is a terrible scourge of a large portion of tropical and semi-tropical parts of the world, affecting both humans and animals.

Heretofore, tartar emitic has been used to combat schistosomiasis, but the drug has not been too successful. The therapeutic dosage of tartar emitic overlaps the toxic dosage, and excessive dosages may involve serious consequences including death of the patient. Furthermore, oral administration of tartar emitic is not practical because of the pronounced irritating effect on the stomach.

Generally, the compounds of my invention may be prepared by reacting 2,3-dimercaptopropanol (commonly known as British Anti-Lewisite or B. A. L.) with antimony trichloride, and then replacing the halide with the desired group.

The formula of the compounds of my invention may be illustrated as follows:

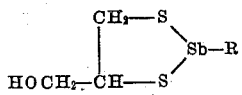

wherein R is chlorine, fluorine, hydroxy, alkoxy, thioalkyl, and thioaryl.

In more detail, the following examples will illustrate the preparation of the compounds of my invention.

EXAMPLE I

*2-chloro-4-methylol-4,5-dihydro-1,3,2-dithiastibiole*

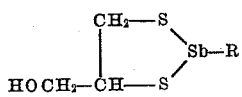

About 25 parts (by weight) of 2,3-dimercaptopropanol (B. A. L.) are dissolved in about 100 parts of chloroform and filtered. The filtered solution is added with stirring to a hot filtered solution of about 45 parts of antimony trichloride dissolved in about 200 parts of chloroform. A gummy precipitate separates, which hardens to a crystalline mass on continued stirring and subsequent cooling. The product is filtered, washed with chloroform, and dried in vacuum. Melting point with decomposition and foaming 96–98° C.

EXAMPLE II

*2-hydroxy-4-methylol-4,5-dihydro-1,3,2-dithiastibiole*

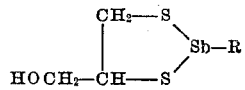

About 10 parts of 2-chloro-4-methylol-4,5-dihydro-1,3,2-dithiastibiole (as prepared per Example I) are suspended in water and washed by continuous stirring and decantation through a filter until the washings are no longer acid to congo red. The 2-hydroxy-stibiole remaining in the funnel is dried in vacuo. Melting point, decomposes 157–159° C. with preliminary shrinking at 145° C.

EXAMPLE III

*2-ethoxy-4-methylol-4,5-dihydro-1,3,2-dithiastibiole*

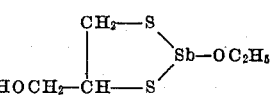

About 6 parts of the 2-chloro-4-methylol-4,5-dihydro-1,3,2-dithiastibiole (as obtained per Example I) are refluxed for about 6 hours in 100 parts of absolute alcohol. The excess alcohol is filtered off, and the ethoxy product is dried in vacuum. Melting point 106–108° C. with foaming.

EXAMPLE IV

*2-n-butoxy-4-methylol-4,5-dihydro-1,3,2-dithiastibiole*

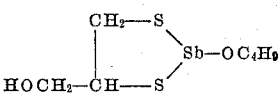

About 12 parts of 2-chloro-4-methylol-4,5-dihydro-1,3,2-dithiastibiole (as prepared per Example I) are refluxed with about 75 parts of n-butanol and about 25 parts of chloroform for about 12 hours. The excess n-butanol and chloroform are filtered off, and the butoxy product is dried in vacuum. Melting point 112–119° C. with foaming.

Other 2-alkoxy products of the stibioles are prepared by following the procedure of Examples III and IV, by refluxing a corresponding amount of the appropriate lower alcohol with the 2-chloro-4-methylol-4,5-dihydro-1,3,2-dithiastibiole. As used herein, lower alkyl alcohols are defined as alcohols containing from one to four carbon atoms inclusive. For example, by refluxing methanol with the compound prepared per Example I, 2-methoxy-4-methylol-4,5-dihydro-1,3,2-dithiastibiole may be prepared. Similarly, by using propanol 2-propoxy-4-methylol-4,5-dihydro-1,3,2-dithiastibiole is prepared.

EXAMPLE V

*2-n-amylthio-4-methylol-4,5-dihydro-1,3,2-dithiastibiole*

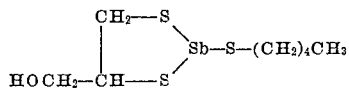

About 9 parts of the 2-chloro-4-methylol-4,5-dihydro-1,3,2-dithiastibiole (as obtained per Example I) are refluxed with about 5 parts of n-amyl mercaptan in about 100 parts of chloroform for about 9 hours, and then filtered. The crystalline amylthio product obtained from the filtration, is dried in a vacuum desiccator. Melting point 107°–109° C. with foaming.

EXAMPLE VI

*2 - ethylthio - 4 - methylol-4,5-dihydro-1,3,2-dithiastibiole*

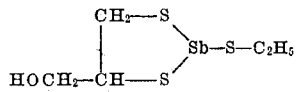

About 28 parts of 2-chloro-4-methylol-4,5-dihydro-1,3,2-dithiastibiole (as prepared per Example I) and about 6.2 parts of ethyl mercaptan are refluxed together in about 100 parts of chloroform for about 12 hours and filtered. The solid material, which is the desired ethylthio product, is filtered and dried in a vacuum desiccator. Melting point 91–94° C. with foaming.

By substituting a corresponding amount of other alkyl mercaptans in the procedure of Examples V and VI other 2-thioalkyl stibioles may be prepared. For instance, alkylthiols containing from 1 to 5 carbon atoms may be used to prepare the corresponding 2-alkyl thiol product.

EXAMPLE VII

*2 - phenylthio - 4 - methylol-4,5-dihydro-1,3,2-dithiastibiole*

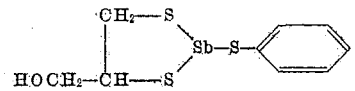

About 10 parts of 2-chloro-4-methylol-4,5-dihydro-1,3,2-dithiastibiole (as obtained per Example I) and about 6.6 parts of thiophenol are refluxed in about 100 parts of chloroform. The 2-phenylthio-dithiastibiole which forms is filtered off and dried over night in vacuo. Melting point 97–104° C. with foaming.

In the examples illustrating the preferred embodiment of the invention, 2-chloro-4-methylol-4,5-dihydro-1,3,2-dithiastibiole is used as the intermediate in preparing other 2-substituted dithiastibioles, because of difficulties in preparing other 2-halo-dithiastibioles. Also the chloroform which is the solvent for the reactions may be replaced by other inert organic solvents, such as carbon disulfide, etc.

The compounds in my invention are valuable in the treatment of schistosomiasis, and they are generally administered orally. The therapeutic dosage of the dithiastibioles is well below the toxic dosage level, which makes it possible to administer a high dosage level for short periods of time. With tartar emetic, on the other hand, the toxic dosage is so low that the drug must be administered in small quantities for long periods of time.

In the preferred embodiment of the invention 2 - hydroxy - 4 - methylol-4,5-dihydro-1,3,2-dithiastibiole is used for oral administration in treating schistosomiasis. The other 2-substituted dithiastibioles are useful in treating schistosomiasis, but the activity decreases from the 2-hydroxy compound to the 2-thioaryl compound as follows: 2-hydroxy>2-chloro>2 alkoxy>2-thioalkyl>2-thioaryl.

Others may readily adapt the invention for use under various conditions of service, by employing one or more of the novel features disclosed, or equivalents thereof. As at present advised with respect to the apparent scope of my invention, I desire to claim the following subject matter.

1. A compound of the formula

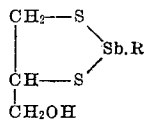

wherein R is selected from the class consisting of halogen, hydroxy, alkoxy, thioalkyl, and thioaryl.

2. A compound of the formula

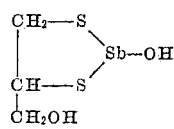

3. A compound of the formula

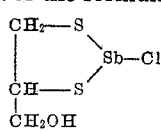

4. A compound of the formula

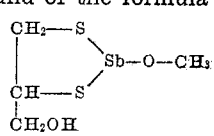

5. A compound of the formula

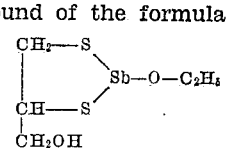

6. A compound of the formula

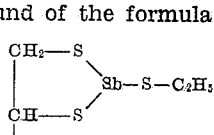

7. The process of producing 2-chloro-4-methylol-4,5-dihydro-1,3,2-dithiastibiole which comprises reacting 2,3-dimercaptopropanol with antimony trichloride in a hot inert solvent.

8. The process of preparing compounds of the formula

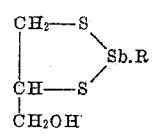

wherein R is selected from the class consisting of hydroxy, alkoxy, thioalkyl and thioaryl; which comprises reacting 2,3-dimercapto propanol with an antimony trihalide to form 2-halo-4-methylol-4,5-dihydro-1,3,2-dithiastibiole, and reacting the resultant dithiastibiole with a compound selected from the class consisting of water, alkyl alcohols, alkyl mercaptans, and aryl mercaptans to form the corresponding 2-substituted - 4 - methylol - 4,5 - dihydro-1,3,2 - dithiastibiole.

9. A process according to claim 8 in which the antimony trihalide is antimony trichloride.

10. The process of preparing 2 - hydroxy - 4 - methylol-4,5-dihydro-1,3,2-dithiastibiole which comprises reacting 2,3-dimercaptopropanol with an antimony trihalide to form 2-halo-4-methylol-4,5-dihydro-1,3,2-dithiastibiole, and hydrolysis of the resulting 2-halo-dithiastibiole to form 2-hydroxy - 4 - methylol - 4,5 - dihydro - 1,3,2 - dithiastibiole.

11. A process according to claim 10 in which the antimony trihalide is antimony trichloride.

12. In the process of producing 2-hydroxy-4-methylol-4,5-dihydro-1,3,2-dithiastibiole the step which comprises refluxing 2-chloro-4-methylol-4,5-dihydro-1,3,2-dithiastibiole with water.

13. The process of producing the compound of claim 4 which comprises reacting 2,3-dimercaptopropanol with an antimony trihalide to form 2 - halo - 4 - methylol - 4,5 - dihydro - 1,3,2 - dithiastibiole, and refluxing the resultant 2-halo-dithiastibiole, with methanol.

14. A process according to claim 13 in which the antimony trihalide is antimony trichloride.

15. The process of producing the compound of claim 5 which comprises reacting 2,3-dimercaptopropanol with an antimony trihalide to produce 2 - halo - 4 - methylol - 4,5 - dihydro - 1,3,2 - dithiastibiole, and refluxing the resultant 2-halo-dithiastibiole with ethanol.

16. A process according to claim 15 in which the antimony trihalide is antimony trichloride.

17. The process of producing the compound of claim 6 which comprises reacting 2,3-dimercaptopropanol with an antimony trihalide to produce 2 - halo - 4 - methylol - 4,5 - dihydro - 1,3,2-dithiastibiole, and reacting the resultant 2-halodithiastibole with ethyl mercaptan.

18. A process according to claim 17 in which the antimony trihalide is antimony trichloride.

LE ROY WILTON CLEMENCE.

REFERENCES CITED

The following references are of record in the file of this patent:

UNITED STATES PATENTS

| Number | Name | Date |
|---|---|---|
| 2,432,797 | Peters et al. | Dec. 16, 1947 |

OTHER REFERENCES

Clark: Chemical Soc. Jour., 1932, part I, p. 1826–1829.

Peters et al.: Biochemical Jour., vol. 41, page 53 (1947).